(12) United States Patent
Schilder (10) Patent No.: US 12,415,414 B2
(45) Date of Patent: Sep. 16, 2025

(54) HYBRID DRIVE SYSTEM FOR A MOTOR VEHICLE, IN PARTICULAR FOR A CAR

(71) Applicant: MERCEDES-BENZ GROUP AG, Stuttgart (DE)

(72) Inventor: Tobias Schilder, Ludwigsburg (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/729,222

(22) PCT Filed: Jan. 13, 2023

(86) PCT No.: PCT/EP2023/050725
§ 371 (c)(1),
(2) Date: Jul. 16, 2024

(87) PCT Pub. No.: WO2023/135246
PCT Pub. Date: Jul. 20, 2023

(65) Prior Publication Data
US 2025/0100368 A1    Mar. 27, 2025

(30) Foreign Application Priority Data

Jan. 17, 2022   (DE) ..................... 10 2022 000 148.9

(51) Int. Cl.
*B60K 6/365*   (2007.10)
*B60K 6/387*   (2007.10)
(Continued)

(52) U.S. Cl.
CPC ............. *B60K 6/365* (2013.01); *B60K 6/387* (2013.01); *B60K 6/48* (2013.01); *B60K 6/547* (2013.01); *B60K 2006/4825* (2013.01)

(58) Field of Classification Search
CPC .......... B60K 6/365; B60K 6/387; B60K 6/48; B60K 6/547; B60K 2006/4825
See application file for complete search history.

(56) References Cited

U.S. PATENT DOCUMENTS 7,824,294 B2 * 11/2010 Van Druten ............. B60K 6/48
                                                                 475/209
8,480,523 B2 *  7/2013 Fuechtner ................ B60K 6/48
                                                                   475/5
(Continued)

FOREIGN PATENT DOCUMENTS

DE   102018001504 A1 *  8/2019 ............. B60K 6/387
DE   102018005034 A1     1/2020
DE   112008001553 B4    10/2021

OTHER PUBLICATIONS

Schilder, DE 102018001504 (Year: 2019).*
(Continued)

*Primary Examiner* — Derek D Knight
(74) *Attorney, Agent, or Firm* — PATENT PORTFOLIO BUILDERS PLLC (57) ABSTRACT

A hybrid drive system for a motor vehicle includes an internal combustion engine having a crankshaft, an electric motor having a rotor, and a gearbox having a cylindrical gear unit with an input shaft coupled or coupleable to the crankshaft for conjoint rotation and an output shaft arranged parallel to the input shaft. The gearbox includes a planetary gear with a first element, a second element, and a third element. The system also includes a differential gearing. The rotor of the electric motor is coupled to the input shaft in such a way that torques provided by the electric motor via the rotor can be introduced into the gearbox via the input shaft. The input shaft is connected to the first element for conjoint rotation. The second element is connected to a first fixed gear for conjoint rotation.

7 Claims, 2 Drawing Sheets

(51) Int. Cl.
  *B60K 6/48* (2007.10)
  *B60K 6/547* (2007.10)

(56) References Cited

U.S. PATENT DOCUMENTS

| | | | |
|---|---|---|---|
| 8,771,139 B2* | 7/2014 | Ideshio | B60L 3/0061 |
| | | | 477/14 |
| 8,911,315 B2* | 12/2014 | Kaltenbach | B60K 6/48 |
| | | | 475/5 |
| 10,272,764 B2 | 4/2019 | Lee et al. | |
| 2003/0013569 A1 | 1/2003 | Doepke | |
| 2007/0060432 A1 | 3/2007 | Van Druten et al. | |

OTHER PUBLICATIONS

International Search Report and Written Opinion mailed Mar. 22, 2023 in related/corresponding International Application No. PCT/EP2023/050725.

Office Action created Sep. 1, 2022 in related/corresponding DE Application No. 10 2022 000 148.9.

* cited by examiner

Fig.1

|   | K1 | S1 | S2 | S3 | S4 |
|---|---|---|---|---|---|
| H1 | X |   | X | X |   |
| H2 |   | X |   | X | X |
| H3 | X | X |   | X |   |
| H4 | X |   |   |   | X |
| E1 |   |   | X | X |   |
| E2 |   |   |   |   | X |
| EVT |   | X |   | X |   |

SP points to row H1.

Fig.2

HYBRID DRIVE SYSTEM FOR A MOTOR VEHICLE, IN PARTICULAR FOR A CAR

BACKGROUND AND SUMMARY OF THE INVENTION

Exemplary embodiments of the invention relate to a hybrid drive system for a motor vehicle, in particular for a car.

Document DE 10 2018 005 034 A1 describes a hybrid drive system comprising an internal combustion engine having a crankshaft and an electric drive unit comprising an electric motor with a rotor and a stator.

Document DE 11 2008 001 553 B4 in the same field describes a hybrid drive system comprising an internal combustion engine, an electric motor, and a gearbox. The gearbox, for its part, comprises a cylindrical gear unit and a planetary gear unit.

Exemplary embodiments of the present invention are directed to further developing a hybrid drive system of the kind mentioned at the outset in such a way that a particularly compact design and a particularly efficient operation of the hybrid drive system can be realized.

The invention relates to a hybrid drive system, also referred to as a drive device or designed as a drive device, for a motor vehicle, in particular for a car and very preferably for a passenger car. This means that the motor vehicle, preferably designed as a car, in particular as a passenger car, in its fully manufactured state comprises the hybrid drive system and can be powered by means of the hybrid drive system. The motor vehicle, in its fully manufactured state, in particular has at least or exactly two axles arranged successively and therefore one behind the other in the vehicle longitudinal direction. Each axle is also referred to as a vehicle axle and has at least or exactly two vehicle wheels also referred to simply as wheels, which are arranged in particular on sides of the motor vehicle that are opposite one another in the vehicle transverse direction. The vehicle wheels are ground contact elements via which the motor vehicle is supported or supportable on a ground surface, downwards in the vehicle height direction. If the motor vehicle is driven along the ground whilst the motor vehicle is supported on the ground via the vehicle wheels, downwards in the vehicle height direction, the vehicle wheels thus roll on the ground, in particular directly. Here, the vehicle wheels of at least or exactly one of the vehicle axles are drivable by means of the hybrid drive system, wherein the vehicle wheels drivable by means of the hybrid drive system are also referred to as drivable or driven vehicle wheels. Where mention is made hereinafter to the vehicle wheels, this shall thus be understood to mean—unless stated otherwise—the vehicle wheels of the motor vehicle drivable by means of the drive system. By driving the vehicle wheels, the motor vehicle as a whole can be driven.

The hybrid drive system comprises an internal combustion engine also referred to as a combustion engine, which has a drive shaft formed as a crankshaft. The internal combustion engine is thus designed as a piston engine. The internal combustion engine can provide, via the crankshaft, first drive torques by means of which the vehicle wheels and thus the motor vehicle can be driven. The hybrid drive system additionally comprises an electric motor having a rotor. The electric motor, via the rotor, can provide second drive torques by means of which the vehicle wheels and thus the motor vehicle can be driven. For example, the electric motor has a stator by means of which the rotor is drivable and thus rotatable about a motor rotation axis relative to the stator. For example, the hybrid drive system has a housing, wherein the rotor is rotatable about the motor rotation axis relative to the housing. In particular, it is provided, for example, that the electric motor can be arranged at least in part in the housing. The hybrid drive system additionally comprises a gearbox, which comprises a cylindrical gear unit and a planetary gear unit. For example, the cylindrical gear unit is thus a first gear unit of the gearbox, and the planetary gear unit is for example a second gear unit of the gearbox, provided additionally to the first gear unit. For example, the cylindrical gear unit and/or the planetary gear unit are arranged in the housing. The planetary gear unit is also referred to as a planetary set or planetary gear set. The cylindrical gear unit has an input shaft as first shaft, wherein the input shaft is coupled or couplable, that is to say connected or connectable, to the crankshaft for conjoint rotation. The cylindrical gear unit additionally has an output shaft which is a second shaft of the cylindrical gear unit. The output shaft is arranged parallel to the input shaft. In particular, the input shaft is rotatable about an input shaft rotation axis relative to the housing. The output shaft is rotatable about an output shaft rotation axis relative to the housing. Since the input shaft and the output shaft are arranged parallel to one another, the input shaft rotation axis and the output shaft rotation axis run parallel to one another, wherein the input shaft rotation axis and the output shaft rotation axis are distanced from one another. In particular, a respective, first torque can be introduced via the input shaft into the cylindrical gear unit, in particular into the gearbox. The respective, first torque results, for example, from the respective, first drive torque and/or from the respective, second drive torque. The cylindrical gear unit, in particular the gearbox as a whole, can provide, via the output shaft, a respective, second torque by means of which the vehicle wheels and the motor vehicle can be driven. In particular, the respective, second torque that is provided or providable by the cylindrical gear unit, in particular by the gearbox as a whole via the output shaft, results from the respective, first torque which is, or rather is in the process of being, or has been introduced into the cylindrical gear unit, in particular the gearbox as a whole, via the input shaft. The cylindrical gear unit is a cylindrical gearing.

The hybrid drive system additionally comprises a differential gearing which is also referred to simply as a differential. In particular, the vehicle wheels are drivable by the output shaft via the differential gearing. In particular, for example, the differential gearing can be driven via the output shaft by the electric motor and by the internal combustion engine, consequently by the rotor and the crankshaft, whereby the vehicle wheels can be driven from the output shaft via the differential gearing. Again, expressed in other words, the output shaft can be driven by the electric motor and by the internal combustion engine, consequently by the rotor and the crankshaft. By driving the output shaft, for example, the differential gearing is driven, so that the vehicle wheels can be driven by means of the output shaft via the differential gearing. In particular, the differential gearing, as is already well known from the general prior art, is designed to permit different speeds of the vehicle wheels, for example when the vehicle is navigating bends, so that, for example, the vehicle wheel on the outside of the bend turn at a faster speed than the vehicle wheel on the inside of the bend, whereas the vehicle wheels are drivable or are driven via the differential gearing by the output shaft and via this by the electric motor and by the internal combustion engine. It is recognizable that the motor vehicle is drivable by means of the electric motor and by means of the internal combustion engine, so that the motor vehicle is a hybrid vehicle.

The planetary gear has a first element, a second element, and a third element. In particular, the planetary gear has a sun gear, a planet support, which is also referred to as a planet carrier, and a ring gear. It is particularly provided here that the planetary gear has planet gears that are mounted rotatably on the planet carrier. The respective planet gear meshes with the sun gear and with the ring gear at the same time, wherein, in particular, the ring gear does not mesh with the sun gear. In other words, the respective planet gear meshes with the sun gear and, in particular at the same time, meshes with the ring gear, wherein the ring gear does not mesh with the sun gear. It is particularly provided here that the sun gear, the planet carrier, and the ring gear are the aforementioned elements of the planetary gear, the elements of which are also referred to as gear elements.

The second element of the planetary gear is connected here to a first fixed gear for conjoint rotation, in particular permanently. The first fixed gear is a first gearwheel, in particular a first spur gear, wherein the first fixed gear can be a component, consequently a gearwheel of the gearbox, in particular cylindrical gear unit. It is particularly provided that the first fixed gear meshes permanently with a first speed gear, which is arranged coaxially to the output shaft, in particular of the gearbox and quite particularly of the cylindrical gear unit.

In order to be able to provide a particularly compact design of the hybrid drive system and also in particular a particularly advantageous drivability and energy efficiency, it is provided in accordance with the invention that the rotor of the electric motor is coupled to the input shaft, in particular permanently and/or torque-transmittingly, in such a way that the second drive torques provided by the electric motor via the rotor, also referred to simply as torques, can be introduced into the gearbox via the input shaft with bypassing of the planetary gear. In other words, the rotor of the electric motor is coupled to the input shaft, in particular permanently and/or torque-transmittingly, in such a way that the torques emanating from the electric motor, in particular from the rotor, can be introduced into the gearbox via the input shaft, and in particular not via a shaft of the planetary gear and also not via the output shaft. The input shaft is connected to the first element of the planetary gear for conjoint rotation, in particular permanently.

A torque flow of torques emanating from the rotor thus runs firstly via the input shaft and only then via the planetary gear and/or the output shaft. The input shaft is indeed connected to the first element of the planetary gear for conjoint rotation, however, the torque flow emanating from the rotor runs, strictly speaking, firstly via the input shaft of the cylindrical gear unit and only then to the first element. The torque flow emanating from the rotor is thus introduced into the gearbox at the input shaft, at least with bypassing of the second element and the third element of the planetary gear.

The first speed gear is in particular a second gearwheel, in particular a second spur gear, of the gearbox, in particular of the cylindrical gear unit. In particular, the first speed gear is arranged, in particular rotatably, on the output shaft. The feature that the first speed gear is a speed gear is to be understood to mean that the first speed gear is not connected, for example, permanently to the output shaft for conjoint rotation, but the first speed gear is assigned a connection element, in particular a first connection element, which is switchable between a connection state and a release state, in particular is movable relative to the output shaft and for example in the axial direction of the output shaft. In the connection state, the first speed gear is connected by means of the coupling element to the output shaft for conjoint rotation. In the release state, the first speed gear is rotatable relative to the output shaft, in particular about the output shaft rotation axis, so that, for example, in the release state the coupling element allows relative rotations, in particular occurring about the output shaft rotation axis, between the output shaft and the first speed gear. The feature that the first fixed gear permanently meshes with the first speed gear is to be understood to mean that the first fixed gear meshes permanently and thus constantly with the first speed gear. The first fixed gear and the first speed gear therefore cannot be shifted between a first state, in which the first fixed gear and the first speed gear mesh with one another, and a second state, in which the first fixed gear and the first speed gear do not mesh with one another, but the first fixed gear and the first speed gear mesh with one another constantly, that is to say always and thus permanently, and consequently are constantly and thus always or permanently engaged with one another.

The first connection element is advantageously permanently connected in a manner known per se to the output shaft for conjoint rotation, but is arranged axially displaceably relative to the output shaft. The first connection element advantageously has, in a known manner, a sliding coupling and a claw toothing.

Within the scope of the present disclosure, the feature that two parts, such as the input shaft and the first element for example, are connected to one another for conjoint rotation is to be understood to mean that the parts connected to one another for conjoint rotation are arranged coaxially to one another and in particular, when the parts are driven, rotate jointly or at the same time about a part rotation axis common to the parts at the same angular velocity, in particular relative to the housing. The feature that two components are connected to one another torque-transmittingly is to be understood to mean that the components are coupled to one another in such a way that torques can be transmitted between the components, wherein, when the components are connected to one another for conjoint rotation, the components are also connected to one another torque-transmittingly.

The feature that two components, such as the rotor and the input shaft for example, are permanently connected to one another torque-transmittingly, is to be understood to mean that there is no provision of a shift element, for example, that is switchable between a coupling state connecting the components to one another torque-transmittingly and an uncoupling state in which no torques can be transmitted between the components, but the components are constantly, or rather always, and thus permanently connected to one another torque-transmittingly, that is to say are connected to one another in such a way that a torque can be transferred between the components. For example, one of the components is thus drivable by the other component, or vice versa. In particular, the feature that the parts or components are permanently connected to one another for conjoint rotation is to be understood to mean that there is no provision of a shift element, for example, that is switchable between a coupling state connecting the components or parts to one another for conjoint rotation and an uncoupling state in which the components or parts are decoupled from one another and rotatable relative to one another so that no torques can be transmitted between the components or parts, but the components or parts are constantly, or rather always, and thus permanently connected or coupled to one another for conjoint rotation.

The feature that two parts, such as the crankshaft and the input shaft, are connectable or couplable to one another for conjoint rotation or torque-transmittingly, is to be understood, in particular, to mean that a shift element or connection element is assigned to the parts and is switchable between at least one coupling state, in which the parts are connected to one another for conjoint rotation or torque-transmittingly by means of the shift element or connection element, and at least one decoupling state, in which the parts are decoupled from one another, so that in the decoupling state the parts are rotatable relative to one another, in particular about the part rotation axis, or no torques can be transmitted between the parts.

The expressions "axially" and "axial direction", unless stated otherwise, relate to a rotation axis of the planetary gear. The rotation axis of the planetary gear means the common rotation axis of the sun gear, the ring gear, and the planet carrier of the planetary gear. The input shaft is arranged coaxially to the rotation axis of the planetary gear.

In order to be able to provide a particularly advantageous drive of the motor vehicle in a manner that is particularly favorable in terms of installation space, it is provided in an embodiment of the invention that the hybrid drive system has an output gear connected to the output shaft for conjoint rotation, in particular permanently, the output gear meshing permanently with a differential input gear of the differential gearing. The output wheel is a third gearwheel, in particular a third spur gear, in particular of a gearbox and very particularly of the cylindrical gear unit. It is further conceivable that the output gear is a bevel gear, in particular a bevel pinion. The differential input gear is a fourth gearwheel, which is permanently meshed with the output gear, also referred to as an output gearwheel or formed as an output gearwheel. In particular, the differential input gear can be a crown gear. The respective, second torque provided or providable by the output shaft can be transmitted via the output gear to the differential input gear and thus, or as a result, into the differential input gear, in order to thus drive the differential gearing and as a result the vehicle wheels and thus the motor vehicle. For example, the differential input gear is an input gearwheel connected for conjoint rotation, in particular permanently, to a differential cage also referred to as a differential body, in particular when the differential gearing is formed as a bevel gear differential. It is further conceivable that the differential input gear, if the differential gearing is formed as a planet differential, consequently as a planet differential gearing, is an input gearwheel of the planet differential.

In other words, a connection for conjoint rotation between two rotatably mounted elements means that the elements are arranged coaxially to one another and are connected to one another in such a way that they rotate at the same angular speed, in particular about the common part rotation axis, in particular when the elements are driven.

A further embodiment is distinguished by a first shift element, by means of which the crankshaft is connectable to the input shaft for conjoint rotation. A particularly needs-oriented and efficient drive of the motor vehicle can hereby be provided in a manner that is particularly favorable in terms of installation space. The first shift element is switchable, for example, between a first coupling state and a first decoupling state. In the first coupling state the crankshaft is connected to the input shaft for conjoint rotation by means of the first shift element. In the first decoupling state the first shift element releases the crankshaft and the input shaft for a relative rotation in relation to one another running in particular about the input shaft rotation axis. In other words, the crankshaft is rotatable relative to the housing, for example, about a crankshaft rotation axis. The crankshaft and the input shaft are preferably arranged coaxially to one another so that the crankshaft rotation axis coincides with the input shaft rotation axis. In the first coupling state, the crankshaft and the input shaft are connected to one another for conjoint rotation by means of the first shift element. In the first decoupling state, the crankshaft and the input shaft can rotate relative to one another about the input shaft rotation axis and thus about the crankshaft rotation axis, so that in the first decoupling state the first shift element releases the crankshaft for a relative rotation occurring in particular about the input shaft rotation axis and relative to the input shaft.

In order to be able to provide a particularly compact design of the hybrid drive system, in particular in the axial direction of the gearbox and thus along the input shaft rotation axis or the output shaft rotation axis, it is provided in a further embodiment of the invention that the first shift element is arranged axially overlapping with the differential gearing. Within the scope of the present disclosure, the feature that two elements, such as the first shift element and the differential gearing are arranged axially overlapping with one another is to be understood to mean that at least a first part of a first of the elements and at least a second part of the second element are arranged in the same axial region, that is to say in in a region of identical axial coordinates. The axial direction means the direction of the crankshaft rotation axis that coincides with the input shaft rotation axis.

In a further, particularly advantageous embodiment the hybrid drive system has a second shift element by means of which the crankshaft is connectable to the third element of the planetary gear for conjoint rotation. For example, a multi-gear nature of the hybrid drive system can hereby be provided, so that a particularly advantageous and in particular needs-oriented drivability of the motor vehicle can be provided. The second shift element is switchable, for example, between a second coupling state and a second decoupling state. In the second coupling state the crankshaft and the third element are connected to one another for conjoint rotation by means of the second shift element. In the second decoupling state the second shift element releases the crankshaft for a relative rotation running about the crankshaft rotation axis relative to the third element, so that in the second decoupling state the crankshaft and the third element of the planetary gear are rotatable relative to one another in particular about the crankshaft rotation axis.

In particular it is provided that the respective gear element, that is to say the respective element of the planetary gearset, in particular when the respective gear element is not connected to the housing for conjoint rotation, is rotatable relative to the housing about the planetary gear rotation axis. It is preferably provided here that the planetary gear is arranged coaxially to the internal combustion engine, that is to say coaxially to the crankshaft, so that the planetary gear rotation axis coincides with the crankshaft rotation axis, or vice versa.

A further embodiment is distinguished by a third shift element, by means of which the third element of the planetary gear is connectable to the housing of the hybrid drive system for conjoint rotation. A multi-gear nature can hereby be provided particularly advantageously, so that a particularly advantageous drivability can be provided. In particular, the third shift element is switchable between a third coupling state and a third decoupling state. In the third coupling state the third element of the planetary gear and the housing are connected to one another for conjoint rotation by means of the third shift element. In the third decoupling state the third shift element releases the third element of the planetary gear for a relative rotation occurring about the planetary gear rotation axis relative to the housing, so that in the third decoupling state the third element can rotate relative to the housing about the planetary gear rotation axis.

In the context of the present disclosure, ordinal number words also referred to as ordinalia, such as "first", "second", "third", etc., are not necessarily used to indicate a number of terms or elements to which the ordinal number words refer, but rather the ordinal number words are used to be able to unambiguously reference the terms or elements to which the ordinal number words refer. Therefore, for example, if the features of claim 5 are incorporated into claim 1 without also incorporating the features of claim 3 or 4 into claim 1, so that then, in claim 1, reference is made to a or the second shift element, but not to a or the first shift element, a or the first shift element is not necessarily also provided.

In order to be able to keep the installation space requirement, the number of parts, the weight, and the costs at a particularly low level, it is provided in a further embodiment of the invention that the second shift element and the third shift element are combined, that is to say amalgamated, to form a coupling shift element with a single actuator. In other words, preferably exactly one actuator is provided, by means of which the coupling shift element is switchable, more specifically, in particular at least between the second coupling state and the third coupling state. Here, in particular the second coupling state is accompanied by the third decoupling state, and the third coupling state is accompanied by the second decoupling state. It is further conceivable that the coupling shift element is switchable into a neutral state, in particular by means of the actuator, wherein in the neutral state both the second decoupling state and the third decoupling state are present, consequently the third element is rotatable in particular about the planetary gear rotation axis both relative to the housing and relative to the crankshaft. For example, in particular when the second shift element and the third shift element are combined to form the coupling shift element, the second shift element is a first part of the coupling shift element and the third shift element is a second part of the coupling shift element. In particular, for example the coupling shift element is movable by means of the actuator relative to the crankshaft and relative to the third element and in particular in the axial direction of the crankshaft and thus, for example, along the crankshaft rotation axis or along the planetary gear rotation axis between at least a first position and at least a second position, in particular in translation. The first position, for example, brings about the second coupling state, and the second position brings about, for example, the third coupling state. Furthermore, it is conceivable, for example, that the coupling shift element is movable by means of the actuator, in particular in translation and/or in the axial direction of the crankshaft and/or relative to the crankshaft or to the housing, into at least a third position, in which or by which the neutral state of the coupling element is brought about or set.

It has proven to be particularly advantageous if the hybrid drive system has a second fixed gear connected to the input shaft for conjoint rotation, in particular permanently. The second fixed gear is, for example, a fourth gearwheel, in particular a fourth spur gear, of the gearbox, in particular the cylindrical gear unit. The second fixed gear meshes permanently with a second speed gear arranged coaxially to the output shaft. In particular, the second speed gear for example is arranged, in particular rotatably, on the output shaft. For example, the second speed gear is a fifth gearwheel, in particular a fifth spur gear, of the gearbox, in particular the cylindrical gear unit. The embodiments above and below for the first speed gear can be transferred readily to the second speed gear, and vice versa. For example, the second speed gear is thus assigned a connection element, in particular second connection element, by means of which the second speed gear is connectable to the output shaft for conjoint rotation. By using the second fixed gear and the second speed gear, a particularly advantageous multi-gear nature can be provided that is particularly favorable in terms of installation space, so that a particularly advantageous drivability can be realized.

The second connection element is advantageously permanently connected to the output shaft for conjoint rotation in a manner known per se, but is arranged axially displaceably relative to the output shaft. The second connection element advantageously has a sliding coupling and a claw toothing, in a manner known per se.

In order to be able to realize a particularly advantageous multi-gear nature and thus a particularly good drivability in a manner that is particularly favorable in terms of installation space, it is provided in a further embodiment of the invention that the hybrid drive system has a third fixed gear, which in particular is permanently connected to the input shaft for conjoint rotation and which is in particular a fifth gearwheel, very particularly a fifth spur gear, of the gearbox, in particular of the cylindrical gear unit. The rotor is coupled to the fixed gear in such a way, in particular coupled permanently and/or torque-transmittingly, that the second drive torques (torques) provided or providable by the electric motor via the rotor can be introduced into the gearbox via the third fixed gear. This allows a particularly compact design of the hybrid drive system to be realized, in particular in the axial direction of the gearbox and thus the crankshaft.

Lastly, in order to realize a particularly compact design of the hybrid drive system, in particular in the axial direction of the hybrid drive system, that is to say viewed along the axial direction of the crankshaft, it has been shown to be particularly advantageous if, viewed in the axial direction of the crankshaft and thus of the hybrid drive system, the first shift element, the third fixed gear, the second fixed gear, the first fixed gear, and the planetary gear are arranged in the aforementioned sequence, consequently in the following sequence one after the other, that is to say consecutively: the first shift element—the third fixed gear—the second fixed gear—the first fixed gear—the planetary gear. Thus, viewed in the axial direction of the crankshaft, the first shift element, the third fixed gear, the second fixed gear, the first fixed gear, and the planetary gear are arranged consecutively in such a way that the third fixed gear is arranged after the first shift element, the second fixed gear after the third fixed gear, the first fixed gear after the second fixed gear, and the planetary gear after the first fixed gear.

Further advantages, features and details of the invention can be found in the following description of a preferred exemplary embodiment and in the drawing. The features and combinations of features mentioned above in the description as well as the features and combinations of features mentioned below in the description of the figures and/or shown alone in the figures can be used not only in the combination indicated in each case, but also in other combinations or on their own, without departing from the scope of the invention.

BRIEF DESCRIPTION OF THE DRAWING FIGURES

In the drawing.

In the figures, like or functionally like elements are provided with like reference signs.

DETAILED DESCRIPTION

Figure 1:
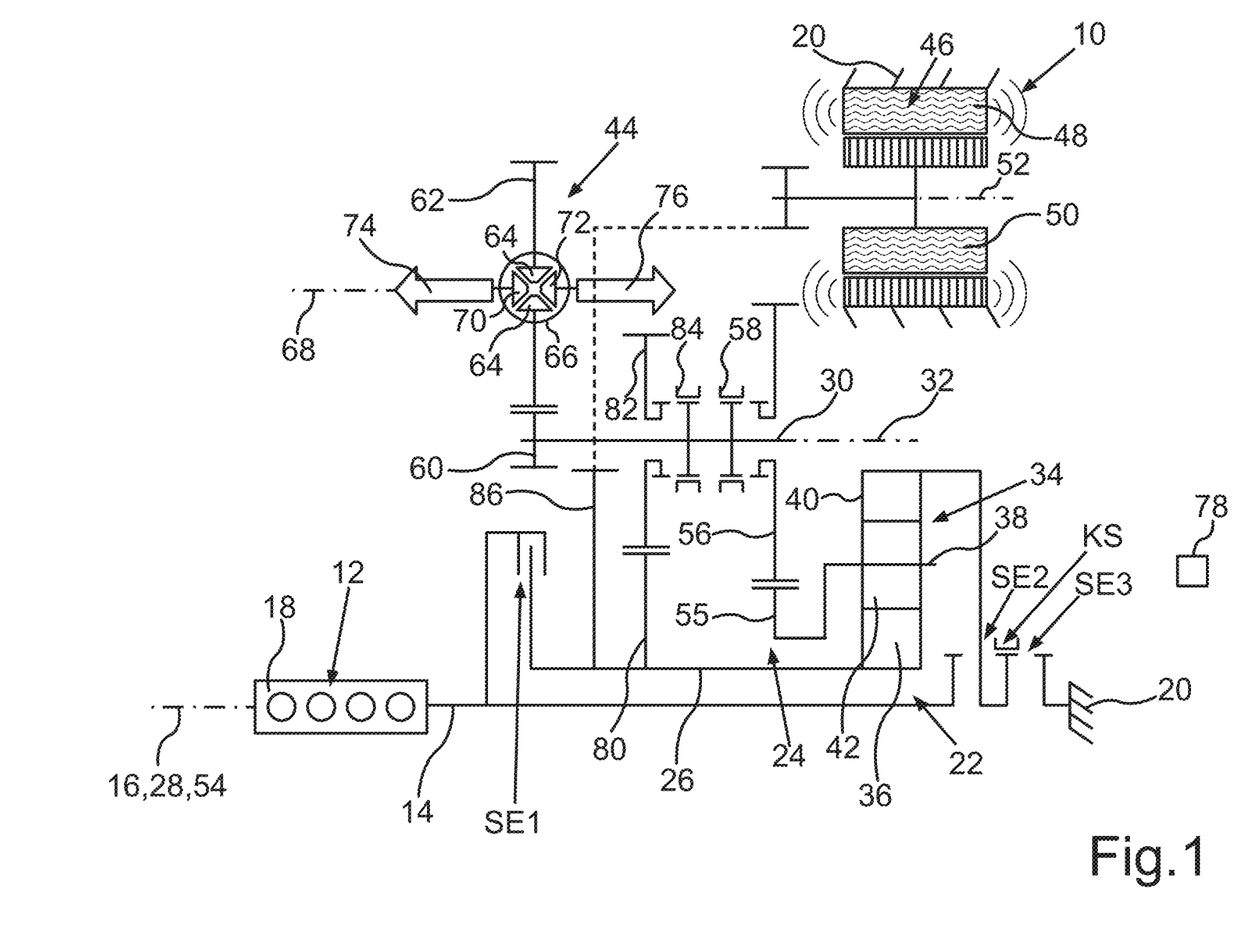
FIG. 1 shows a schematic representation of a hybrid drive system for a motor vehicle.

FIG. 1 shows a schematic representation of a hybrid drive system 10 for a motor vehicle, in particular for a motor vehicle such as a passenger car. This means that the motor vehicle comprises the hybrid drive system 10 in its fully manufactured state and can be powered by means of the hybrid drive system 10. The motor vehicle has, for example, at least or exactly two axles arranged consecutively in the vehicle longitudinal direction and thus one behind the other, which are also referred to as vehicle axles. The respective vehicle axle has at least or exactly two vehicle wheels, also referred to as wheels, wherein the vehicle wheels of each axle are arranged on opposite sides of the motor vehicle in the vehicle transverse direction. For example, in relation to the vehicle wheels of the vehicle axles, all the vehicle wheels of the vehicle axles or only the vehicle wheels of precisely one of the vehicle axles can be driven, wherein the vehicle wheels that can be driven by means of the hybrid drive system 10 are also referred to as driven or drivable vehicle wheels. When the term "vehicle wheels" is used in the following, it refers to the vehicle wheels that can be driven by means of the hybrid drive system 10, unless otherwise specified. By driving the vehicle wheels, the motor vehicle as a whole can be driven.

The hybrid drive system 10 comprises an internal combustion engine 12, which is also referred to as a combustion engine and has an output shaft in the form of a crankshaft 14. The crankshaft 14 is rotatable about a crankshaft rotation axis 16, which coincides with the axial direction of the crankshaft 14, relative to a motor housing 18 of the internal combustion engine 12, wherein the motor housing 18 is, for example, a crankcase, in particular a cylinder crankcase, of the internal combustion engine 12. The internal combustion engine 12 can provide first drive torques for driving the vehicle wheels via the crankshaft 14. The hybrid drive system 10, which is also simply referred to as a drive system or drive device, has a housing 20 shown particularly schematically in FIG. 1, which can be the motor housing 18. It is also conceivable that the housing 20 is provided in addition to the motor housing 18, so that the motor housing 18 and the housing 20 can, for example, be formed separately from each other and connected to each other. The hybrid drive system 10 has a gearbox 22, which can be arranged in the housing 20, for example. The gearbox 22 has a first gear unit in the form of a cylindrical gear unit 24, which has an input shaft 26. The input shaft 26 can be connected to the crankshaft 14 for conjoint rotation, in particular permanently. In the exemplary embodiment shown in FIG. 1, the input shaft 26 is connectable, that is to say couplable, to the crankshaft 14 for conjoint rotation, as will be explained in greater detail below. The input shaft 26 is rotatable relative to the housing 20 about an input shaft rotation axis 28. The input shaft 26 is arranged coaxially to the crankshaft 14 so that the input shaft rotation axis 28 coincides with the crankshaft rotation axis 16. For example, a respective input torque can be introduced into the cylindrical gear unit 24 and thus into the gearbox 22 as a whole via the input shaft 26.

The cylindrical gear unit 24 has, in addition to the input shaft 26, an output shaft 30 arranged parallel to the input shaft 26. This means that the output shaft 30 is rotatable about an output shaft rotation axis 32 relative to the housing 20. The input shaft rotation axis 28 and the output shaft rotation axis 32 run parallel to each other here, wherein the output shaft rotation axis 32 is spaced from the input shaft rotation axis 28, or vice versa. For example, a respective output torque can be discharged via the output shaft 30 from the cylindrical gear unit 24 and at the same time from the gearbox 22 as a whole, wherein the respective output torque results, for example, from the respective input torque which is introduced into the gearbox 22 via the input shaft 26. The gearbox 22 can provide the respective output torque so that the vehicle wheels can be driven by means of the respective output torque. The respective input torque is also referred to as the first torque, and the respective output torque is also referred to as the second torque.

The gearbox 22 additionally has a planetary gear 34, which is also referred to as a planetary set or planetary gear set. For example, the planetary gear 34 is arranged at least partially in the housing 20. The planetary gear 34 has, in particular precisely, one first element 36, advantageously designed as a sun gear, and, in particular precisely, one second element 38, advantageously designed as a planet support, which is also referred to as a planet carrier. Furthermore, the planetary gear 34 has, in particular precisely, one third element 40, preferably designed as a ring gear. The first element 36 designed as a sun gear, the second element 38 designed as a planet carrier, and the third element 40 designed as a ring gear are also referred to as gear elements or elements of the planetary gear 34. It can be seen from FIG. 1 that the planetary gear 34 also has at least one or more planet gears 42. The planet gear 42 is rotatably mounted on the planet carrier and thus on the second element 38 and meshes, in particular simultaneously, with the first element 36 and with the third element 40.

The planetary gear 34 is particularly advantageously designed as a simple planetary set with precisely one sun gear, precisely one planet carrier, and precisely one ring gear.

The hybrid drive system 10 also comprises a differential gearing 44, which is designed as a bevel differential, for example. The bevel differential is also referred to as a bevel gear differential. It is of course conceivable that the differential gearing 44, which is also simply referred to as a differential, is designed as another differential, such as a planetary differential or spur differential or a crown gear differential. The differential gearing 44 can be driven by the output shaft 30, consequently by the respective output torque, since the respective output torque can be introduced into the differential gearing 44. The vehicle wheels can be driven by the output shaft 30 via the differential gearing 44. In other words, the vehicle wheels can be driven by the differential gearing 44 and via this by the output shaft 30, so that the vehicle wheels can be driven via the differential gearing 44 by means of the respective output torque. In particular, the vehicle wheels are coupled torque-transmittingly to the differential gearing 44, in particular permanently, wherein, for example, the vehicle wheels are connected, that is to say coupled, torque-transmittingly to the output shaft 30 via the differential gearing 44, in particular permanently.

The hybrid drive system 10 additionally comprises an electric motor 46, which has a stator 48 and a rotor 50. The rotor 50 can be driven by means of the stator 48 and thus can be rotated about a motor rotation axis 52 relative to the stator 48 and relative to the housing 20. It can be seen that the motor rotation axis 52 runs parallel to the output shaft rotation axis 32 and parallel to the crankshaft rotation axis 16 or to the input shaft rotation axis 28, wherein the motor rotation axis 52 is spaced apart from the output shaft rotation axis 32 and from the crankshaft rotation axis 16 or from the input shaft rotation axis 28. In particular, if the respective element of the planetary gear 34 is not connected to the housing 20 for conjoint rotation, the respective element is rotatable about a planetary gear rotation axis 54 relative to the housing 20. In the present case, the planetary gear 34 is arranged coaxially to the crankshaft 14 and coaxially to the input shaft 26, so that the planetary gear rotation axis 54 coincides with the crankshaft rotation axis 16 and thus with the input shaft rotation axis 28. Thus, when reference is made to the crankshaft rotation axis 16 in the following, this is also to be understood to mean the input shaft rotation axis 28 and the planetary gearbox rotation axis 54 and vice versa, unless otherwise stated.

The electric motor 46 can provide second drive torques via its rotor 50. The vehicle wheels can be driven by means of the respective, first drive torque and by means of the respective, second drive torque. It is conceivable here, for example, that in a first operating mode the vehicle wheels are driven by means of the respective, first drive torque and thus by means of the internal combustion engine 12, while the vehicle wheels are not driven by the electric motor 46. Furthermore, it is conceivable that, in particular in a second operating mode, the vehicle wheels are driven by means of the respective, second drive torque and thus by means of the electric motor 46, while the vehicle wheels are not driven by the internal combustion engine 12. Furthermore, it is conceivable that, in particular in a third operating mode, the vehicle wheels are driven both by means of the respective, first drive torque and thus by means of the internal combustion engine 12 and also by means of the respective, second drive torque and thus by means of the electric motor 46. In particular, the respective, first drive torque and the respective, second drive torque can be introduced into the cylindrical gear unit 24, in particular into the gearbox 22 as a whole, via the input shaft 26, so that, for example, the respective input torque results from the respective, first drive torque and/or from the respective, second drive torque.

Thus, for example, the respective output torque results from the respective, first drive torque and/or from the respective, second drive torque, in particular depending on whether the internal combustion engine 12 provides the respective, first drive torque while the electric motor 46 does not provide the respective, second drive torque, the electric motor 46 provides the respective, second drive torque while the internal combustion engine 12 does not provide the respective, first drive torque or the internal combustion engine 12 provides the respective, first drive torque and at the same time the electric motor 46 provides the respective, second drive torque.

In order to be able to realize a particularly compact design of the hybrid drive system 10 and particularly advantageous drivability, the rotor 50 of the electric motor 46 is coupled to the input shaft 26, in particular permanently and/or torque-transmittingly, in such a way that the respective, second drive torque provided by the electric motor 46 via the rotor 50, simply also referred to as torque, can be transmitted to the input shaft 26 and can be introduced into the gearbox 22 as a whole via the input shaft 26. The input shaft 26 is connected to a first of the elements of the planetary gear 34 for conjoint rotation, in particular permanently. A second of the elements of the planetary gear 34 is connected to a first fixed wheel 55 for conjoint rotation, in particular permanently. The first fixed gear 55 is a first gearwheel of the gearbox 22, in particular of the cylindrical gear unit 24. In particular, the first fixed gear 55 is a first spur gear of the gearbox 22, in particular of the cylindrical gear unit 24. The first fixed gear 55 permanently meshes with a first speed gear 56 arranged coaxially with the output shaft 30. In the exemplary embodiment shown in FIG. 1, the speed gear 56 is arranged rotatably on the output shaft 30. The first speed gear 56 is a second gearwheel of the gearbox 22, in particular of the cylindrical gear unit 24. In particular, the speed gear 56 is a second spur gear of the gearbox 22, in particular of the cylindrical gear unit 24. In the embodiment shown in FIG. 1, the first element 36 of the planetary gearbox 34 is the sun gear. The second element 38 of the planetary gear 34 is the planet support, which is also referred to as the planet carrier. Accordingly, the ring gear 40 is a third of the elements of the planetary gear 34.

The speed gear 56 is assigned a connection element 58, for example in the form of a sliding coupling, which can be switched between a first connection state and a first release state, in particular is displaceable in the axial direction of the output shaft 30 relative to the output shaft 30. In the first connection state, the speed gear 56 is connected to the output shaft 30 for conjoint rotation by means of the connection element 58. In the first release state, the connection element 58 releases the speed gear 56 for rotations about the output shaft rotation axis 32 relative to the output shaft 30, so that in the first release state the speed gear 56 is rotatable about the output shaft rotation axis 32 relative to the output shaft 30.

An output gear 60 is connected to the output shaft 30 for conjoint rotation, in particular permanently. The output gear 60 is a third gearwheel, in particular a third spur gear, of the gearbox 22, in particular of the cylindrical gear unit 24. Furthermore, the output gear 60 can be a bevel gear. The output gear 60 permanently meshes with a differential input gear 62 of the differential gearbox 44. The differential input gear 62 is a fourth gearwheel, which can, for example, be designed as a fourth spur gear or as a crown gear. In the exemplary embodiment shown in FIG. 1, the differential gearbox 44 comprises compensating gearwheels 64 and a differential cage 66, also known as a differential basket, to which the differential input gear 62 is connected for conjoint rotation, in particular permanently. The differential cage 66 and the differential input gear 62 are rotatable, in particular with the compensating gearwheels 64, about a differential rotation axis 68 relative to the housing 20. In addition, the compensating gearwheels 64 are rotatable relative to the differential cage 66 about a common compensating gearwheel rotation axis, which runs perpendicular to the differential rotation axis 68. The differential rotation axis 68 runs parallel to the motor rotation axis 52 and parallel to the crankshaft rotation axis 16 and parallel to the output shaft rotation axis 32, and is spaced apart from each of these. The differential gearing 44 additionally comprises output gearwheels 70 and 72 that mesh with the compensating gearwheels 64. The respective output gearwheel 70, 72 is connected to a respective output shaft 74, 76 for conjoint rotation, in particular permanently. A first of the vehicle wheels can be driven via the output shaft 74, and a second of the vehicle wheels can be driven via the output shaft 76. In particular, the first vehicle wheel is connected to the output shaft 74 torque-transmittingly or for conjoint rotation, in particular permanently, wherein, for example, the second vehicle wheel is connected to the output shaft 76 torque-transmittingly or for conjoint rotation, in particular permanently.

The hybrid drive system 10 comprises a first shift element SE1, which is also referred to as a clutch or K1. For example, the shift element SE1 is a friction clutch, in particular a multi-plate clutch. The crankshaft 14 can be connected to the input shaft 26 for conjoint rotation by means of the shift element SE1. The first shift element SE1 is arranged axially overlapping with the differential gearing 44.

The hybrid drive system 10 comprises a second shift element SE2, by means of which the crankshaft 14 is connectable to the third element 40 of the planetary gear 34 for conjoint rotation. A third shift element SE3 is also provided, by means of which the ring gear 40 (third element) of the planetary gear 34 is connectable to the housing 20 of the hybrid drive system 10 for conjoint rotation. In the exemplary embodiment shown in FIG. 1, the second shift element SE2 and the third shift element SE3 are combined, that is to say amalgamated, to form a coupling shift element KS. For example, the coupling shift element KS is designed as a sliding coupling. The coupling shift element KS and thus the shift elements SE2 and SE3 can be switched between a first coupling state, a second coupling state, and a neutral state, in particular moved in the axial direction of the crankshaft 14 relative to the crankshaft 14, in particular translationally, by means of precisely one actuator 78 shown particularly schematically in FIG. 1. In the first coupling state, the crankshaft 14 is connected to the third element 40 for conjoint rotation by means of the coupling shift element KS, while the third element 40 and thus the crankshaft 14 can rotate about the crankshaft rotation axis 16 relative to the housing 20. In the second coupling state, the third element 40 is connected to the housing 20 for conjoint rotation by means of the coupling shift element KS, while the crankshaft 14 can rotate about the crankshaft rotation axis relative to the housing 20 and thus also relative to the third element 40. In the neutral state, the crankshaft 14 and the third element 40 can rotate about the crankshaft rotation axis 16 relative to one another, and the third element 40 and the crankshaft 14 can rotate about the crankshaft rotation axis 16 relative to the housing 20. It can be seen that the shift element SE2 and the shift element SE3 are respective parts of the coupling shift element KS, so that the shift elements SE2 and SE3 can be switched, that is to say switched over, by means of the precisely one actuator 78.

A second fixed gear 80 is provided, which is connected to the input shaft 26 for conjoint rotation, in particular permanently, and which is, for example, a fifth gearwheel, in particular a fifth spur gear, of the gearbox 22, in particular of the cylindrical gear unit 24. The fixed gear 80 permanently meshes with a second speed gear 82, which is arranged coaxially to the output shaft 30 and which is, for example, a sixth gearwheel, in particular a sixth spur gear of the gearbox 22, in particular of the cylindrical gear unit 24. In the present case, the speed gear 82, like the speed gear 56, is arranged on the output shaft 30. A second connection element 84 is assigned to the speed gear 82, which is switchable between a second connection state and a second release state, in particular movable, in particular displaceable, in the axial direction of the output shaft 30 and/or relative to the output shaft 30. In the second connection state, the speed gear 82, which is rotatably arranged on the output shaft 30, is connected to the output shaft 30 for conjoint rotation by means of the connection element 84. In the second release state, the speed gear 82 is rotatable about the output shaft rotation axis 32 relative to the output shaft 30.

Also provided is a third fixed gear 86 connected to the input shaft 26 for conjoint rotation, in particular permanently, which is, for example, a seventh gearwheel, in particular a seventh spur gear, of the gearbox 22, in particular cylindrical gear unit 24. The rotor 50 is coupled to the third fixed gear 86, in particular permanently and/or torque-transmittingly, in such a way that the respective, second drive torque, which is provided or can be provided by the electric motor 46 and the rotor 50, can be transmitted to the third fixed gear 86 and can be introduced into the gearbox 22 via the third fixed gear 86.

The shift element SE1 is also referred to as K1. The shift element SE2 is also referred to as S1, and the shift element SE3 is also referred to as S2. The connection element 58 is also referred to as S3, and the connection element 84 is also referred to as S4.

Figure 2:
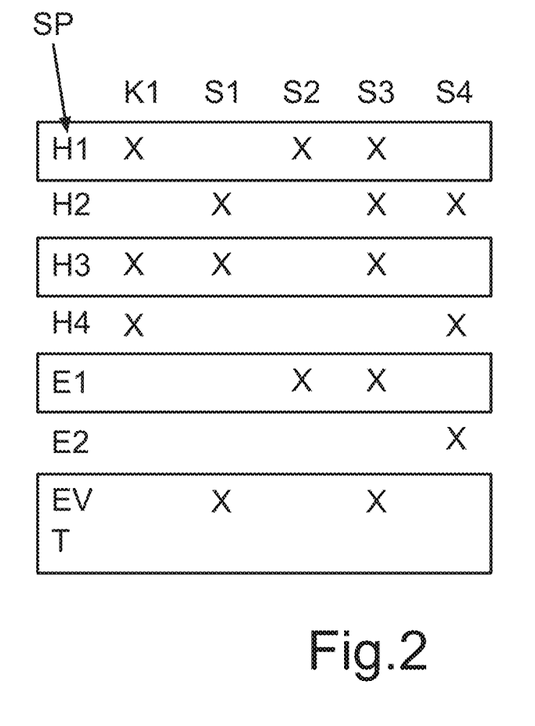
FIG. 2 shows a gearshift table for illustrating gears of the hybrid drive system.

FIG. 2 shows a gearshift table, wherein gears H1, H2, H3, H4, E1, E2 and EVT of the hybrid drive system 10 are entered in a column SP of the gearshift table. The gears are operating modes or are also referred to as operating modes of the hybrid drive system 10. To engage gear H1, consequently to activate it, the shift elements SE1, SE3 and the connection element 58, consequently K1, S2 and S3, are closed, while the shift element SE2 and the connection element 84, consequently S1 and S4, are open. In other words, the shift elements SE1 and SE3 are in their coupled states and the connection element 58 is in its connection state, while the shift element SE2 is in its uncoupled state and the connection element 84 is in its released state. To engage gear H2, S1 and S3 and S4 are closed, while K1 and S2 are open. To engage gear H3, K1, S1 and S3 are closed, while S2 and S4 are open. To engage gear H4, K1 and S4 are closed while S1, S2 and S3 are open. To engage gear E1, consequently to activate it, S2 and S3 are closed while K1, S1 and S4 are open. To engage gear E2, S4 is closed while K1, S1, S2 and S3 are open. To engage gear EVT, S1 and S3 are closed while K1, S2 and S4 are open.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

LIST OF REFERENCE SIGNS 10 hybrid drive system
12 internal combustion engine
14 crankshaft
16 crankshaft rotation axis
18 motor housing 20 housing
22 gearbox
24 cylindrical gear unit
26 input shaft
28 input shaft rotation axis
30 output shaft
32 output shaft rotation axis
34 planetary gear
36 first element
38 second element
40 third element
42 planet gear
44 differential gearing
46 electric motor
48 stator
50 rotor
52 motor rotation axis
54 planetary gear rotation axis
55 first fixed gear
56 first speed gear
58 first connection element
60 output gear
62 differential input gear
64 compensating gear
66 differential cage
68 differential rotation axis
70 output gear
72 output gear
74 output shaft
76 output shaft
78 actuator
80 second fixed gear
82 second speed gear
84 second connection element
86 third fixed gear
KS coupling shift element
SE1 first shift element
SE2 second shift element
SE3 third shift element

The invention claimed is:

1. A hybrid drive system for a motor vehicle, the hybrid drive system comprising:
an internal combustion engine having a crankshaft;
an electric motor having a rotor;
a gearbox comprising a cylindrical gear unit with an input shaft coupled or couplable to the crankshaft to conjointly rotate and an output shaft arranged parallel to the input shaft, and a planetary gear with precisely one sun gear, precisely one planet carrier, precisely one ring gear, and one or more planet gears being rotatably mounted on the planet carrier and meshing with the precisely one sun gear and with the precisely one ring gear;
a differential gearing; and
an output wheel connected to the output shaft to conjointly rotate, wherein the output wheel and the output shaft are arranged coaxially to each other, wherein the output wheel and the output shaft, when driven, have a same angular velocity about a rotation axis common to the output wheel and the output shaft, wherein the output wheel permanently meshes with a differential input gear of the differential gearing,
wherein the rotor is permanently connected to the input shaft,
wherein the input shaft is permanently connected to the precisely one sun gear to conjointly rotate,
wherein the precisely one planet carrier is connected to a first fixed gear to conjointly rotate,
wherein the first fixed gear meshes permanently with a first speed gear arranged coaxially to the output shaft,
wherein the rotor of the electric motor is coupled to the input shaft in such a way that torques provided by the electric motor via the rotor are introducible into the gearbox via the input shaft while bypassing the precisely one planet carrier and the precisely one ring gear of the planetary gear,
wherein the hybrid drive system further comprises
a first shift element configured to connect the crankshaft to the input shaft to conjointly rotate; and
a second shift element configured to connect the crankshaft to the precisely one ring gear of the planetary gear to conjointly rotate.

2. The hybrid drive system of claim 1, wherein the first shift element is arranged axially overlapping with the differential gearing.

3. The hybrid drive system of claim 1, further comprising:
a third shift element configured to connect the precisely one ring gear to a housing of the hybrid drive system to conjointly rotate.

4. The hybrid drive system of claim 3, wherein the second shift element and the third shift element are combined as a coupling shift element with a single actuator.

5. The hybrid drive system of claim 1, further comprising:
a second fixed gear, which is connected to the input shaft to conjointly rotate and which meshes permanently with a second speed gear arranged coaxially to the output shaft.

6. The hybrid drive system of claim 5, further comprising:
a third fixed gear, which is connected to the input shaft to conjointly rotate and to which the rotor is coupled in such a way that torques provided by the electric motor via the rotor are introducible into the gearbox via the third fixed gear.

7. The hybrid drive system of claim 6, wherein viewed in an axial direction of the crankshaft, the first shift element, the third fixed gear, the second fixed gear, the first fixed gear and the planetary gear are arranged in a following sequence one after the other: the first shift element, the third fixed gear, the second fixed gear, the first fixed gear, and the planetary gear.

* * * * *